United States Patent
Iwasa et al.

(10) Patent No.: US 6,911,253 B2
(45) Date of Patent: Jun. 28, 2005

(54) POROUS RESIN FILM

(75) Inventors: Yasuo Iwasa, Ibaraki (JP); Akihiko Ohno, Ibaraki (JP); Nobuhiro Shibuya, Ibaraki (JP)

(73) Assignee: Yupo Corporation, Tokyo (JP)

( * ) Notice: Subject to any disclaimer, the term of this patent is extended or adjusted under 35 U.S.C. 154(b) by 130 days.

(21) Appl. No.: 09/832,924

(22) Filed: Apr. 12, 2001

(65) Prior Publication Data

US 2002/0012786 A1 Jan. 31, 2002

Related U.S. Application Data

(63) Continuation of application No. PCT/JP99/05547, filed on Oct. 7, 1999.

(30) Foreign Application Priority Data

Oct. 12, 1998 (JP) .......................................... 10-288967
Aug. 4, 1999 (JP) .......................................... 11-220656

(51) Int. Cl.$^7$ ............................. B32B 5/22; B32B 7/12; B32B 27/08
(52) U.S. Cl. ................. 428/317.9; 428/315.5; 428/315.7; 428/315.9; 428/516
(58) Field of Search ............................ 428/317.9, 315.5, 428/315.7, 315.9, 516

(56) References Cited

U.S. PATENT DOCUMENTS 4,245,061 A * 1/1981 Tachi et al. ................. 525/286
5,233,924 A * 8/1993 Ohba et al. ................. 101/483
6,217,687 B1 4/2001 Shibata et al.

FOREIGN PATENT DOCUMENTS

| EP | 0 855 420 A2 | 7/1998 |
|---|---|---|
| JP | 53-81578 | 7/1978 |
| JP | 57-100142 | 6/1982 |
| JP | 10-264510 | 6/1998 |
| JP | 10-204196 | 8/1998 |
| JP | 10-212367 | 8/1998 |

OTHER PUBLICATIONS

Derwent Abstract of JP 53081578A.*

Computer translation of JP 2001–019830.*

Derwent Abstract of JP 63006040A.*

* cited by examiner

*Primary Examiner*—Terrel Morris
*Assistant Examiner*—Victor S Chang
(74) *Attorney, Agent, or Firm*—Oblon, Spivak, McClelland, Maier & Neustadt, P.C.

(57) ABSTRACT

A porous resin film which comprises 30 to 90 wt % of a thermoplastic resin containing a hydrophilic thermoplastic resin component; and 70 to 10 wt % of an inorganic or organic fine powder was disclosed. The porous resin film of the present invention is valuable as an ink-jet recording medium since the film shows excellent ink absorbing and drying properties even when a large amount of ink is discharged thereon, and thus can produce thereon a high-definition image.

24 Claims, No Drawings

POROUS RESIN FILM

This application is a continuation of PCT/JP99/05547 with a filing date of Oct. 7, 1999, which claims the priority from Japan Applications 10/288,967, filed Oct. 12,1998; and 11/220,656, filed Aug. 4, 1999.

FIELD OF THE INVENTION

The present invention relates to a porous resin film excellent in ink drying property. The present invention relates also to a recording medium excellent in ink-jet printing property and capable of producing thereon a high-definition image.

DISCUSSION OF THE BACKGROUND

Keeping pace with advancement in multi-media technology, ink-jet printers are widely employed in both fields of professional use and public use. Ink-jet printers are advantageous in various aspects such that they can readily be multi-colored and can readily be expanded in image size, and that they require only a low printing cost. In particular, ink-jet printers using a water-base ink, which is less causative of environmental and safety problems as compared with an oil-base ink, form the mainstream of recent printers.

The ink-jet printers are widely used also as a means for obtaining a hard copy which includes processed image as well as character information. Thus there is a growing need for finer image after the printing.

Fineness of the image is governed by drying property of an ink applied on a recording medium. In a continuous printing onto a plurality of recording media for example, one recording medium previously printed may be overlaid with another recording medium. If an ink on the previously printed recording medium dries insufficiently, the ink may be caught by the overlaid recording medium, which result in a stained image.

One popular method for enhancing the image fineness is such that using a recording medium which comprises a base layer made of synthetic paper, plastic film or pulp paper and an ink accepting layer coated thereon containing a hydrophilic resin or inorganic fine powder (Japanese Laid-Open Patent Publications Nos. 3-82589 and 9-216456). While the method is successful in yielding a high-definition image when the ink discharge is relatively small, the method may cause insufficient drying of the ink when the discharge is relatively large. Increasing the thickness of the coated layer, which is one proposed countermeasure for such problem, will raise the cost and thus ruin the practicability as an ink-jet recording medium.

Another proposal relates to an ink-jet recording medium in which an ink accepting layer mainly composed of a hydrophilic resin is formed by the heat lamination process or the extrusion lamination process (Japanese Laid-Open Patent Publications 8-12871, 9-1920 and 9-314083. Such ink-jet recording medium has also been unsatisfiable since the medium cannot produce thereon a desirable image when the ink discharge is relatively large.

It is therefore an object of the present invention to provide a porous resin film and an inexpensive recording medium using thereof which can ensure rapid drying of the ink, for example, in ink-jet printing and thus can produce thereon a desirable image even when the ink discharge is relatively large.

SUMMARY OF THE INVENTION

The present inventors found out after the extensive studies to accomplish the foregoing objects that using a porous film comprising a water-soluble or water-swelling hydrophilic resin compounded with an inorganic or organic fine powder, or a stacked material having such porous film as a surface layer thereof can provide a desirable recording medium excellent in ink drying property and suitable for printing process, such as ink-jet printing using a water-base ink, which led us to propose the present invention.

That is, the present invention provides a porous resin film (referred to as "porous resin film (i)", hereinafter) including 30 to 90 wt % of a thermoplastic resin that includes a hydrophilic thermoplastic resin component; and 70 to 10 wt % of an inorganic or organic fine powder.

The present invention also provides a stacked material which includes a base layer and the foregoing porous resin film stacked on at least one side of such base layer. The base layer preferably includes a resin film (referred to as "resin film (ii)", hereinafter) which contains 40 to 100 wt % of a thermoplastic resin and 60 to 0 wt % of an inorganic or organic fine powder. The resin film (ii) is preferably stretched.

The present invention still also provides a recording medium using the foregoing porous resin film or the stacked material, in particular the one for ink-jet printing.

DESCRIPTION OF THE PREFERRED EMBODIMENTS

In one preferred embodiment of the present invention, a porosity of the porous resin film (i) is 10% or above and preferably within a range from 20 to 80%. It is recommendable that the surface of the porous resin film (i) has a contact angle to water of 110° or less, and it is more preferable that difference between a maximum value and a minimum value of the contact angle to water is adjusted within 30°. The thermoplastic resin preferably comprises 5 to 100 weight parts of the hydrophilic thermoplastic resin component per 100 weight parts of a non-hydrophilic resin component. The non-hydrophilic thermoplastic resin component is preferably a polyolefin-base resin, and the hydrophilic thermoplastic resin component is preferably an alkylene oxide-base polymer. The inorganic or organic fine powder preferably has an average grain size of 0.1 to 10 μm. The porous resin film (i) is preferably stretched.

The resin film (ii) used as a base layer of the stacked material may be composed of any one of a non-hydrophilic thermoplastic resin, a hydrophilic thermoplastic resin and a mixture of a non-hydrophilic thermoplastic resin and a hydrophilic thermoplastic resin, or a mixture of any one of such resin with an inorganic or organic fine powder.

The porous resin film (i) of the present invention is characterized in that containing 0 to 90 wt % of a thermoplastic resin containing a hydrophilic thermoplastic resin component; and 70 to 10 wt % of an inorganic or organic fine powder. Such porous resin film (i) of the present invention is excellent in ink drying property, so that it is most preferably used for a recording medium such as an ink-jet recording medium. In such application, it is preferable to use the porous resin film (i) as being stacked on at least on one side of a base layer, that is, in a form of a stacked material. The base layer is preferably a resin film (ii) which contains 40 to 100 wt % of a thermoplastic resin and 60 to 0 wt % of an inorganic or organic fine powder.

There is no specific limitation on the species of the thermoplastic resin composing the porous resin film (i) and the resin film (ii). The species of the non-hydrophilic thermoplastic resin component composing the porous resin film (i) and the resin film (ii) may be the same or differ with each other. Examples of such non-hydrophilic thermoplastic resin component include polyolefinic resins such as ethylene-base resins including high density polyethylene and middle density polyethylene, propylene-base resins, poly(4-methyl-1-pentene), ethylene-cyclic olefin copolymer; polyamide-base resins such as 6-nylon, 6,6-nylon and 6, T-nylon; thermoplastic polyester-base resins such as polyethylene terephthalate and copolymer thereof, polybutylene terephthalate and copolymer thereof, aliphatic polyester; polycarbonate, atactic polystyrene and syndiotactic polystyrene. Among these, most preferable is a non-polar polyolefinic resins.

In particular among such polyolefinic resins, propylene-base resins are preferably used from viewpoints of chemical resistance and cost. The propylene-base resin may be an isotactic homopolymer or syndiotactic homopolymer made solely of propylene units. It is also allowable to use polypropylene-base copolymers having a variety of stereo-regularities obtained by co-polymerizing propylene with α-olefin(s) such as ethylene, 1-butene, 1-hexene, 1-heptene or 4-methyl-1-pentene. The copolymer may be of binary system, ternary system or higher, and may be a random copolymer or block copolymer. The propylene-base resin is preferably used as being mixed with 2 to 25 wt % of a resin having a melting point lower than that of a propylene homopolymer. Such resin having a lower melting point is exemplified as high-density or low-density polyethylene.

There is no specific limitation on the species of the hydrophilic thermoplastic resin component used for the porous resin film (i) and the resin film (ii) so far as such resin component can dissolve or swell in water, and can exhibit plasticity at the room temperature or above. The hydrophilic thermoplastic resins used for the porous resin film (i) and the resin film (ii) may be the same or differ with each other.

Examples of such hydrophilic thermoplastic resin component include polyvinyl-base resins such as synthetic polyvinyl alcohol and copolymer or crosslinked product thereof, and polyvinyl pyrrolidone and copolymer thereof; polyacrylic resins or salts thereof (for example, sodium salt, potassium salt, lithium salt and primary to quaternary ammonium salts) such as polymer, copolymer or crosslinked product of acrylic, methacrylic or maleic ester containing a hydroxyalkyl group such as 2-hydroxyethyl group or 2-hydroxypropyl group, polyacrylamide or copolymer thereof, hydrolysate of polymer or crosslinked polymer of acrylonitrile, and polymer, copolymer or crosslinked product of acrylic or methacrylic acid; polymaleic acid, maleic acid copolymer, crosslinked product thereof or salts thereof (for example, sodium salt, potassium salt, lithium salt and primary to quaternary ammonium salts), and hydrolysate of vinyl acetate-methyl methacrylate copolymer; water-soluble nylon, urethane-base resins such as water-soluble polyurethane, super absorbent polyurethane and thermoplastic polyurethane; polyalkylene oxide-base resins such as polyethylene oxide or copolymer thereof, and polypropylene oxide or copolymer thereof; polyether amide and polyether ester amide; polyvinyl amine and polyallyl amine or copolymers thereof. It is also allowable to select from those described in literatures such as "Kobunshi Kako (Polymer Processing)" (1984), vol. 9, p.32–38, the entire contents of which are hereby incorporated by reference. It is particularly preferable to use resins such that exhibiting plasticity at the room temperature or higher and ensuring simple film formation.

It is still also preferable to select the hydrophilic resin which can dissolve into water or swell at a water absorption factor of 5 or above, more advantageously 8 to 50, within 30 minutes at the room temperature. The water absorption factor is defined by processing the hydrophilic resin into a test piece of approx. 0.1 mm thick by means of extrusion from a T-die or heat press forming, then immersing the test piece into a distilled water at the room temperature (25°) for 30 minutes to allow water absorption, and then dividing post-absorption weight of the test piece by pre-absorption weight. It should now be noted that natural polymers such as gum arabic, tragacanth gum, corn starch, wheat starch and collagen are not applicable to the hydrophilic thermoplastic resin component since they are difficult to function at a high temperature required for melting the plastics.

Among various hydrophilic thermoplastic resins, it is preferable to choose polyalkylene oxide-base resins since they can exhibit plasticity at the room temperature or above, and film formation of which is relatively simple. Examples of such polyalkylene oxide-base resins applicable to the present invention include reaction product of alkylene oxide with a dibasic acid or a multi-basic acid having three or more carboxylic group; ester bond-containing, polyester-base polyalkylene oxides typified by a reaction product of polyalkylene oxide compound with a dicarboxilic acid compound, a lower alkyl ester compound thereof, a carboxylic acid having three or more carboxyl groups, or with a lower alkyl ester compound thereof; urethane bond-containing, polyurethane-base polyalkylene oxides typified by a reaction product of polyalkylene oxide compound with a compound having two or more isocyanate groups; carbonate bond-containing polyalkylene oxides typified by a reaction product of polyalkylene oxide compound with a carbonate diester compound such as dialkyl carbonate; amide bond-containing polyalkylene oxides; polyalkylene oxides containing urea bond or thiourea bond; polyalkylene oxides containing a sulfide bond or sulfonyl bond; and polyalkylene oxides containing a phosphate ester bond or phosphite ester bond.

Among these, the ester bond-containing polyalkylene oxides are preferable from the viewpoint of achieving a higher level of mixing and dispersion properties with the non-hydrophilic thermoplastic resin component.

Species of the alkylene oxides to be used are not specifically limited, and typical examples thereof include ethylene oxide, propylene oxide, 1,2-epoxybutane, 1,2-epoxypentane, 1,2-epoxyhexane and other α-olefin oxides having the carbon number of up to 30. Among these more preferable are ethylene oxide, propylene oxide, 1,2-epoxybutane and 1,2-epoxyhexane. These alkylene oxides may be used individually or in any combination of two or more thereof. For the case using two or more alkylene oxides, the alkylene oxides may sequentially be reacted one by one, or may be reacted en bloc by mixing two or more species.

While there is no specific limitation on the species of the alkylene oxide, it is preferable to use a polymer or copolymer of the foregoing alkylene oxide having a weight-average molecular weight of 5,000 to 30,000. Using a polyalkylene oxide compound having a weight-average molecular weight of 5,000 or above will upgrade the film forming property, and using a polyalkylene oxide compound having a weight-average molecular weight of 30,000 or below will advantageously improve productivity of such resin since the addition reaction of the alkylene oxide proceeds at a relatively high speed.

The polyalkylene oxide compound can be obtained by addition polymerization of alkylene oxides. One preferable example of such polyalkylene oxide compound is such that being obtained by additionally polymerizing an organic compound having two active hydrogen atoms with the foregoing alkylene oxide.

Examples of such organic compound having two active hydrogen atoms include ethylene glycol, diethylene glycol, propylene glycol, dipropylene glycol, 1,4-butanediol, 1,6-hexanediol, neopentyl glycol, bisphenol-A, polytetramethylene glycol, alicyclic diol such as 1,4-di(hydroxymethyl) cyclohexane, and amines such as butylamine, laurylamine, octyl amine, cyclohexylamine and aniline, while being not limited thereto. Among these most preferable are ethylene glycol, diethylene glycol, propylene glycol, dipropylene glycol, 1,4-butanediol and 1,6-hexanediol.

Preferable polyalkylene oxide compound is such that being obtained by additionally polymerizing an organic compound having two active hydrogen atoms with ethylene oxide, then with a $C_4$ or larger alkylene oxide, and further with ethylene oxide. Thus obtained polyalkylene oxide compound can further be reacted with a dicarboxylic acid compound, to thereby yield a non-hydrophilic resin component, in particular a polyalkylene oxide-base resin relatively excellent in compatibility with a polyolefmic resin. Thus a film obtained by mixing such polyalkylene oxide-base resin and polyolefinic resin can ensure a desirable ink absorption in the printing process, and can thus improve uniformity in the absorption.

Structure of the carboxylic acid or lower alkyl ester compound thereof to be reacted with the polyalkylene oxide compound is not specifically limited so far as the compound has within the molecule thereof two or more, and more preferably two, carboxylic group or derived group therefrom. Specific examples thereof include $C_6$ to $C_{36}$, more preferably $C_8$ to $C_{24}$, linear, branched, alicyclic, or aromatic di- or tri-carboxylic acid and lower alkyl ester of such di- or tri-carboxylic acid. Still more specifically, examples thereof include sebacic acid, 1,10-decamethylene dicarboxylic acid, 1,14-tetradecamethylene dicarboxylic acid, 1,18-octadecamethylene dicarboxylic acid, 1,32-dotriacontamethylene dicarboxylic acid, cyclohexane dicarboxylic acid, phthalic acid, terephthalic acid, isophthalic acid, various isomers of naphthalene dicarboxylic acid, 4,4'-biphenylene dicarboxylic acid and lower alkyl esters of these compounds. Among these preferable is either one of a $C_{12}$ to $C_{36}$ linear dicarboxylic acid or lower alkyl ester thereof. In more detail, $C_{12}$ to $C_{36}$ saturated linear aliphatic dicarboxylic acid, $C_{12}$ to $C_{36}$ unsaturated linear aliphatic dicarboxylic acid or lower alkyl esters thereof can preferably be used. Still more preferable among these compounds are $C_{12}$ to $C_{26}$ linear dicarboxylic acid and lower alkyl ester thereof, and in particular $C_{16}$ to $C_{24}$ linear dicarboxylic acid and lower alkyl ester thereof. Specific examples of such $C_{12}$ to $C_{36}$ linear dicarboxylic acid include 1,10-decamethylene dicarboxylic acid, 1,14-tetradecamethylene dicarboxylic acid, 1,18-octadecamethylene dicarboxylic acid and 1,32-dotriacontamethylene dicarboxylic acid. Examples of the lower alkyl ester thereof include methyl ester, dimethyl ester, ethyl ester, diethyl ester, propyl ester and dipropyl ester of these dicarboxylic acids. These compounds may be used individually or in any combination of two or more thereof.

Particularly preferable alkylene oxide-base polymer can be obtained by co-polymerizing polyalkylene oxide with a $C_{12}$ to $C_{36}$ aliphatic dicarboxylic acid or a lower alkyl ester thereof to thereby adjust an overall molecular weight to 20,000 to 400,000, more preferably to 80,000 to 200,000; where the polyalkylene oxide is obtained by additionally polymerizing an organic compound having two active hydrogen atoms, which can be selected from ethylene glycol, diethylene glycol, propylene glycol, dipropylene glycol and 1,4-butanediol, with an alkylene oxide mainly composed of ethylene oxide and having additionally polymerized therewith any one of propylene oxide, 1,2-epoxybutane and 1,2-epoxyhexane to thereby achieve a molecular weight of 10,000 to 30,000.

For the case that the non-hydrophilic thermoplastic resin component and the hydrophilic thermoplastic resin component are mixed for use in the porous resin film (i), the hydrophilic resin component is preferably mixed in an amount of 5 to 100 weight parts per 100 weight parts of the non-hydrophilic thermoplastic resin component from the viewpoint of properly adjusting the a contact angle to water to thereby improve ink drying property. More preferable mixing relates to 5 to 100 weight parts, and more preferably 10 to 60 weight parts, of the polyalkylene oxide-base resin per 100 weight parts of the polyolefinic resin.

A dispersion modifier may preferably be added when the hydrophilic thermoplastic resin component and non-hydrophilic thermoplastic resin component are kneaded under fusion. The dispersion modifier is beneficial in improving the dispersion property and dispersion stability, and is valuable in reducing difference between maximum and minimum values of surface contact angle, to thereby equalize the absorption of water-base fluid.

Possible examples of the dispersion modifier include those of polar resin-base such as epoxy group-containing resin, acid modified resin, hydroxy group-containing resin and amino modified resin; and phosphorus-containing compound such as phosphite compound and phosphonate compound.

Specific examples of the polar resin-base dispersion modifier include ethylene-glycidyl methacrylate copolymer, ethylene-vinyl acetate-glycidyl methacrylate copolymer, ethylene-methyl methacrylate-glycidyl methacrylate copolymer, ethylene-ethyl methacrylate-glycidyl methacrylate copolymer, ethylene-ethyl acrylate-glycidyl methacrylate copolymer, glycidyl methacrylate graft modified polypropylene, glycidyl methacrylate-styrene graft modified polypropylene, epoxy-modified polybutadiene, epoxy-modified polyisoprene, (partial) epoxy-modified styrene-butadiene block copolymer, (partial) epoxy-modified styrene-butadiene-styrene block copolymer, (partial) epoxy-modified styrene-isoprene block copolymer, maleic acid modified polypropylene, 2-hydroxyethyl methacrylate graft modified polypropylene, and 3,3-dimethylaminoethyl methacrylate graft modified polypropylene.

Among these most preferable are ethylene-glycidyl methacrylate copolymer, ethylene-vinyl acetate-glycidyl methacrylate copolymer, glycidyl methacrylate graft modified polypropylene, and partial epoxy-modified styrene-butadiene-styrene block copolymer.

Specific examples of the phosphorus-containing dispersion modifier include bis(2,4-dimethylphenyl) pentaerythritol diphosphite, bis(2,6-dimethylphenyl) pentaerythritol diphosphite, bis(2,3,6-trimethylphenyl) pentaerythritol diphosphite, bis(2-tert-butylphenyl) pentaerythritol diphosphite, bis(3-tert-butylphenyl) pentaerythritol diphosphite, bis(4-tert-butylphenyl) pentaerythritol diphosphite, bis(2,4-di-tert-butylphenyl) pentaerythritol diphosphite, bis(2,6-di-tert-butylphenyl) pentaerythritol diphosphite, bis(2,4,6-tri-tert-butylphenyl) pentaerythritol diphosphite, bis(2,6-di-tert-butyl-4-methylphenyl)pentaerythritol diphosphite, bis(2,6-di-tert-butyl-4-ethylphenyl)pentaerythritol diphosphite, distearylpentaerythritol diphosphite, dinaphthylpentaerythritol diphosphite, diphenylpentaerythritol diphosphite, bis (2-methylphenyl)pentaerythritol diphosphite, bis(3-methylphenyl)pentaerytlritol diphosphite, bis(4-methylphenyl)pentaerythritol diphosphite, bis(nonylphenyl) pentaerythritol diphosphite, bis(biphenyl)pentaerythritol diphosphite, (phenyl)(1,2-ethanediol)phosphite, (4-methylphenyl)(1,2-ethanediol)phosphite, (2,6-dimethylphenyl)(1,2-ethanediol)phosphite, (4-tert-butylphenyl)(1,2-ethanediol)phosphite, (2,4-di-tert-butylphenyl)(1,2-ethanediol)phosphite, (2,6-di-tert-butylphenyl)(1,2-ethanediol)phosphite, (2,6-di-tert-butyl-4-methylphenyl)(1,2-ethanediol)phosphite, (2,6-di-tert-butyl-4-methylphenyl)(1,4-butanediol)phosphite, tetrakis(2,4-di-tert-butylphenyl)-4,4'-bisphenylenediphosphonite, (phenyl) (1,3-propanediol)phosphite, (4-methylphenyl) (1,3-propanediol)phosphite, (2,6-dimethylphenyl)(1,3-propanediol)phosphite, (4-tert-butylphenyl)(1,3-propanediol)phosphite, (2,4-di-tert-butylphenyl)(1,3-propanediol)phosphite, (2,6-di-tert-butylphenyl)(1,3-propanediol)phosphite, (2,6-di-tert-butyl-4-methylphenyl) (1,3-propanediol)phosphite, (2,4-di-tert-butylphenyl)(2-ethyl-2-butyl-1,3-propanediol)phosphite, (2,4,6-tri-tert-butylphenyl)(2-ethyl-2-butyl-1,3-propanediol) phosphite, and (2,6-di-tert-butyl-4-methylphenyl)(2-ethyl-2-butyl-1,3-propanediol) phosphite.

Among these most preferable are bis(2,4-di-tert-butylphenyl)pentaerythritol diphosphite, bis(2,6-di-tert-butyl-4-methylphenyl)pentaerythritol diphophite, distearylpentaerythritol diphosphite, bis(nonylphenyl)pentaerythritol diphosphite, tetrakis (2,4-di-tert-butylphenyl)-4,4'-bisphenylene diphosphonate and any mixtures thereof.

From the viewpoint of upgrading the ink absorption, an amount of use of the polar resin-base dispersion modifier is generally 0.1 weight parts or above per 100 weight parts of the non-hydrophilic thermoplastic resin component, more preferably 0.5 to 30 weight parts, and still more preferably 1 to 15 weight parts. An amount of use of the phosphorus-containing dispersion modifier is generally 0.01 weight parts or above per 100 weight parts of the non-hydrophilic thermoplastic resin component, more preferably 0.1 to 20 weight parts, and still more preferably 0.2 to 3 weight parts.

The porous resin film (i) of the present invention may contain a decomposition product (for example through hydrolysis or thermal decomposition) generated from such polar resin-base or phosphorus-containing dispersion modifier.

There is no specific limitation on the species of the organic or inorganic fine powder used for the porous resin film (i). The inorganic fine powder may be of, for example, heavy calcium carbonate, precipitated calcium carbonate, agglomerative precipitated calcium carbonate, clay, talc, titanium oxide, barium sulfate, zinc oxide, magnesium oxide, diatom earth or silicon oxide.

The organic fine powder has a different origin with that for the thermoplastic resin composing the porous resin film (i), and is preferably selected from those having a melting point or glass transition point higher than that of the thermoplastic resin to be used and incompatible therewith in consideration of pore formation. The organic fine powder may be of, for example, polyethylene terephthalate, polybutylene terephthalate, polyamide, polycarbonate, polyethylene naphthalate, polystyrene, melamine resin, polyethylene sulfide, polyimide, polyethyl ether ketone, polyphenylene sulfite, polymer of methacrylate or acrylate, or any copolymer containing any of such compounds.

The fine powder can be dispersed into the porous resin film (i) by a non-limitative method. That is, the fine powder may be synthesized in a fine powdery form after the polymerization and then be added with other components, or may previously be dispersed in a finer form before being kneaded under fusion with other components.

For use in the porous resin film (i) or the resin film (ii) composing the base layer, any one of the fine powder can be selected or two or more species thereof can be combined. The combination of two or more species also allows mixed use of an organic fine powder and an inorganic fine powder.

Among such inorganic and organic fine powders, heavy calcium carbonate, clay and diatom earth are particularly preferable for their inexpensiveness and pore forming property.

An average grain size of the fine powder used for the porous resin film (i) resides in a range from 0.01 to 10 $\mu$m, and more preferably from 0.1 to 3 $\mu$m. Selecting the grain size within such range will allow formation of sufficient amount of properly-sized pores by stretching and will effectively prevent wrinkle generation on the film. In particular for the porous resin film (i), such selection will allow the film surface to have micro cracks, which can enhance the ink drying property and effectively prevent stain on the film during the printing. It is now favorable to suppress the content of coarse grain (with a grain size of 44 $\mu$m or above, for example) as low as 10 ppm or below so as to prevent projections from being formed on the surface of the porous resin film (i).

When the fine powder is mixed into the thermoplastic resin by kneading, additives such as dispersion aid, antioxidant, solubilizing agent, flame retarder, ultraviolet stabilizer, coloring pigment or the like can optionally be added. In particular, the porous resin film (i) and the resin film (ii) composing the base layer may have a desirable color using an inorganic or organic coloring pigment. It is also preferable to add an antioxidant or ultraviolet stabilizer to the porous resin film (i) of the present invention if it is intended for use as a durable material. For the case using an organic fine powder, proper selection of a type and amount of addition of a solubilizing agent is critical since they govern the particle morphology of the organic fine powder. Polar group-containing polyolefin is a preferable example of such solubilizing agent. An amount of addition of the solubilizing agent is generally 0.5 to 10 weight parts per 100 weight parts of the organic fine powder.

The porous resin film (i) comprises 30 to 90 wt %, more preferably 35 to 60 wt %, of a thermoplastic resin containing a hydrophilic thermoplastic resin component; and 70 to 10 wt %, more preferably 65 to 40 wt %, of an inorganic or organic fine powder. The content of the inorganic or organic fine powder exceeding 70 wt % tends to embrittle the surface layer of the film and tends to cause omission of such fine powder upon mechanical impact, and the content less than 10 wt % tends to degrade the ink drying property. Stretching the porous resin film (i) while keeping the parameters within the above ranges will ensure excellent ink absorbing and drying properties and mechanical strength of such film.

The surface contact angle to water of the porous resin film (i) of the present invention is 110° or below, more preferably within a range from 20 to 100°, and still more preferably within a range from 20° to 80°. A range from 45° to 80° is particularly recommendable for the film for use in ink-jet printing.

The surface contact angle to water exceeding 110° will sometimes result in insufficient fluid penetration by a water-base ink or a glue using a water-base medium. On the other hand, too small contact angle is not always desirable in order to properly balance lateral spreading of a droplet of a water-base ink in a direction parallel to the film surface and vertical penetration thereof along the direction of the film thickness. The surface contact angle of 110° or below is substantially effective in improving printing property in the ink-jet printing.

It should now be noted that "surface contact angle to water" is obtained by placing a droplet of pure water on the film surface, and measuring the contact angle using a commercially available contact angle gauge. The measurement is repeated 10 times for one species of the film, where an unwet new sample film is subjected to each measurement, and the contact angle to water is calculated as an average of the values from ten times of the measurement. Model CA-D, a product of Kyowa Kaimen Kagaku K. K., is one example of such commercially available contact angle gauge for use in the measurement.

"Difference between maximum and minimum values of the contact angle to water" as described in the context of this specification represents difference between a maximum value and a minimum value obtained from 10 times of such measurement. The smaller the difference between the maximum and minimum values is, the more uniform the fluid adsorption becomes when an ink or water-base medium is used, so that such recording medium can provide an excellent printing property. The difference between the maximum and minimum values is preferably 30° or less, more preferably 20° or less, and still more preferably 10° or less.

The thickness of the porous resin film (i) of the present invention is not limitative, and can properly be selected depending on a required level of the absorption property. Typical thickness is 10 to 500 μm, more preferably 20 to 350 μm, and still more preferably 25 to 200 μm.

The porous resin film (i) of the present invention has a porous structure having micro pores, where the porosity of such porous resin film (i) is preferably 10% or above, more preferably 20 to 80%, still more preferably 20 to 75%, and most preferably 30 to 65%. Selecting the porosity at 10% or above can upgrade the ink absorbing and drying properties. The porous resin film (i) having a porosity of 80% or below ensures an almost desirable material strength of the film. It should now be noted that the "porosity" as described in the context of this specification represents a value expressed by the equation below, or can be obtained based on an areal ratio of the pores observed in a visual field of an electron microscope and calculated using an image analyzer (LUZEX IID; product of Nireco Corporation):

$$\text{porosity } (\%) = \frac{100(\rho_0 - \rho)}{\rho_0}$$

where, $\rho_0$ is the true density of the porous resin film (i), and $\rho$ is the density of the porous resin film (i). For the stretched porous resin film (i), $\rho_0$ denotes the pre-stretching density of the film, and $\rho$ denotes the post-stretching density of the film.

The porous resin film (i) of the present invention can be fabricated by various combination of processes known to those skilled in the art. Any porous resin film or recording material fabricated by any process will be within a scope of the present invention so far as conditions described in claim 1 are satisfied.

Processes for fabricating the porous resin film (i) of the present invention preferably include process steps necessary for achieving the porosity of 10% or above. Such porosity is attainable by film stretching method based on pore genera-tion through stretching, foaming method based on use of a foaming agent, and a method using pore-containing grains, among which the film stretching method is most preferable.

It is not always necessary in the stretching to stretch the porous resin film (i) alone. In the fabrication of the stacked material, for example, the porous resin film (i) and the base layer may be stacked after being individually stretched, or may be stretched en bloc after being stacked. Also the porous resin film (i) and the base layer can be stacked or stretched in a series of same processes.

A preferable fabrication process relates to such that having a step for stacking the porous resin film (i) and the resin film (ii) as a base layer; and a step for stretching the obtained stack en bloc, which is simpler and costless as compared with the case of separate stretching before the stacking. This also enables more simple control of the pores generated in the porous resin film (i) and the resin film (ii). In particular, controlling the amount of pores generated by the stretching in the porous resin film (i) larger than in the resin film (ii) allows maximum use of such porous resin film (i) as a layer for improving the ink drying property.

The stretching may be effected by a variety of known methods. The stretching temperature can properly be selected within a known temperature range according to nature of the thermoplastic resin to be employed. That is, for the case an amorphous thermoplastic resin is employed, the stretching temperature will be equal to or higher than the glass transition point of such resin; and for the case a crystalline thermoplastic resin is employed, the stretching temperature will be within a range from the glass transition point of the amorphous portion thereof to the melting point of the crystalline portion thereof. More specifically, a temperature lower by 2 to 60° than the melting point of a thermoplastic resin to be employed is preferable.

Applicable means for the stretching include longitudinal stretching based on difference in the peripheral speeds between the roll groups, transverse stretching using a tenter oven, rolling, and simultaneous biaxial stretching based on a combined use of a tenter oven and a linear motor.

There is no special limitation on the stretching factor, and the factor can properly be determined depending on purpose of use of the porous resin film of the present invention and properties of the thermoplastic resin employed. For example for the case using propylene homopolymer or copolymer as the thermoplastic resin, typical factor for the uniaxial stretching is within a range from approx. 1.2 to 12 times, and preferably 2 to 10 times; and areal factor for the biaxial stretching is within a range from 1.5 to 60 times, and preferably 10 to 50 times. For the case using other thermoplastic resin, typical factor for the uniaxial stretching is within a range from approx. 1.2 to 10 times, and preferably 2 to 7 times; and areal factor for the biaxial stretching is within a range from 1.5 to 20 times, and preferably 4 to 12 times. The stretching speed is preferably 0.1 to 350 m/min. Annealing at a high temperature may optionally be allowable.

The porous resin film (i) of the present invention may be used without further processing, or may be used in a form stacked at least on one surface of a separate base layer. Possible materials for composing the base layer include transparent or opaque film such as polyester film, polyamide film and polyolefin film; plastic board, pulp paper, non-woven fabric, cloth, wood board and metal plate. The thickness of the base layer composing the stacked material is not specifically limited, and is typically set in a range from 5 to 1,000 μm, more preferably from 20 to 500 μm. Also the thickness of the stacked material is not specifically limited, and can properly be selected according to the purpose of use. A typical range of the thickness is 15 to 2,000 µm, more preferably 20 to 500 µm, and still more preferably 25 to 350 µm.

The porous resin film (i) of the present invention is preferably composed to provide a recording material by being added with a proper functional layer as described later in the Examples. A typical recording medium is obtained by forming the porous resin film (i) of the present invention on a base layer made of a thermoplastic film. A recording medium having on the surface thereof the porous resin film (i) of the present invention is beneficial in particular for use in ink-jet printing. While species for composing the base layer is not specifically limited, a desirable example thereof relates to a film containing a polypropylene-base resin and an inorganic fine powder. The recording medium thus obtained by stacking the porous resin film (i) of the present invention with other film will have a total thickness of approx. 60 µm to 1 mm.

The base layer of the stacked material is preferably composed of the resin film (ii). The resin and inorganic or organic fine powder for use in the resin film (ii) may be used as a single species selected from the foregoing non-hydrophilic thermoplastic resins or the foregoing inorganic or organic fine powders, or in combination of two or more species selected therefrom. It is also allowable to use a non-hydrophilic thermoplastic resin component as being mixed with a hydrophilic thermoplastic resin component, where such resin components may be the same with those used in the porous resin film (i). For the case of the mixed use of a non-hydrophilic and hydrophilic thermoplastic resin components for the resin film (ii), it is preferable to mix 10 to 100 weight parts of the hydrophilic thermoplastic resin component per 100 weight parts of the non-hydrophilic thermoplastic resin component.

The resin film (ii) contains the thermoplastic resin component in an amount of 40 to 100 wt %, more preferably 40 to 85%; and contains the inorganic or organic fine powder in an amount of 60 to 0 wt %, more preferably 60 to 15 wt %. The content of the organic or inorganic fine powder exceeding 80 wt % will result in difficulty in fabricating the resin film (ii) having a uniform thickness, and the content less than 15 wt % will result in insufficient pore formation and higher cost. The grain size of the inorganic or organic fine powder for use in the resin film (ii) is preferably within a range from 0.1 to 10 µm, and more preferably from 0.6 to 3 µm.

The porous resin film (i) or the stacked material using such film can optionally be subjected to surface oxidation treatment. The surface oxidation treatment may enhance the hydrophilicity or absorption property of the film surface, and may improve coating property or adhesion property of an ink fixing agent and ink acception layer. The surface oxidation treatment can specifically be effected by corona discharge treatment, flame treatment, plasma treatment, glow dischrage treatment and ozone treatment. Among these, preferable are corona treatment and flame treatment, and the former is more preferable.

The energy of, for example, the corona treatment is 600 to 12,000 $J/m^2$ (10 to 200 $W \cdot min/m^2$), and more preferably 1,200 to 9,000 $J/m^2$ (20 to 180 $W \cdot min/m^2$). At least an energy of 600 $J/m^2$ (10 $W \cdot min/m^2$) is necessary to obtain sufficient effect of the corona treatment, and an energy of 12,000 $J/m^2$ (200 $W \cdot min/m^2$) is sufficient enough since the effect will saturate above 12,000 $J/m^2$. The energy of the flame treatment is 8,000 to 200,000 $J/m^2$, and more preferably 20,000 to 100,000 $J/m^2$. At least an energy of 8,000 $J/m^2$ is necessary to obtain distinct effect of the flame treatment, and an energy of 200,000 $J/m^2$ is sufficient enough since the effect will saturate above 200,000 $J/m^2$.

The porous resin film (i) can have on the outermost portion thereof a coloring material fixation layer for fixing coloring materials such as dyes and pigments. The coloring material fixation layer is responsible for shaping ink dots into exact circles to thereby ensure sharp image, and for preventing migration of the coloring material due to water or moisture. Thus the coloring material fixation layer is particularly beneficial when the porous resin film (i) of the present invention is intended for use as a recording medium for the ink-jet printing.

The coloring material fixation layer can be formed by coating or lamination. Using a cationic hydrophilic resin and fine powder is preferable in order to upgrade the coloring material fixation property. One preferable example of such cationic hydrophilic resin is such that having cationic groups such as amino groups, modified groups thereof or quaternary ammonium salt groups on the principal chains or side chains of the polymer.

The porous resin film (i) of the present invention can also be subjected to various printings other than ink-jet printing according to purposes of use, where types and methods for the printing are not limitative. That is, the printing can be effected by any of known methods including gravure printing using an ink which contains pigment dispersed in a known vehicle, water-base flexography, and silk screen printing. Other applicable methods relate to metal vapor deposition, gross printing and mat printing. Patterns to be printed may properly be selected from natural or abstract items such as animals, landscape, lattice or polka dots.

EXAMPLES

The present invention will now be detailed referring to specific Examples and Comparative Examples. Materials, amount of use thereof, ratio of use, operations or the like can properly be modified without departing from the spirit of the present invention. Thus it is to be understood that the present invention is by no means limited to the specific examples explained below.

Example 1

To a mixture of 38 wt % of polypropylene having a melt flow rate (MFR) of 1 g/10 min (at 230° and under 2.16 kg load) and 12 wt % of alkylene oxide-base resin (an ester formed between octadecamethylene dicarboxylic acid and a copolymer of approx 90% of ethylene oxide and approx. 10% of butylene oxide and having a weight-average molecular weight of approx. 20,000; overall weight-average molecular weight=114,000; 30-minute water absorption factor=14 g/g; abbreviated as PEPO1), 50 wt % of calcium carbonate powder (average grain size=1 µm; referred to as calcium carbonate 1) was added, the mixture was kneaded under fusion using a biaxial kneader, extruded in a strand form, and then cut into pellets. In the above kneading under fusion, 0.1 weight parts of 4-methyl-2,6-di-tert-butylphenol and 0.05 weight parts of Irganox 1010®(product of Ciba Geigy) were added as antioxidants per total 100 weight parts of polypropylene, polyalkylene oxide-base resin and calcium carbonate powder.

The obtained pellets were melted at 230° C. in a press forming machine, compressed at 50 $kgf/cm^2$, cooled to 30° C., to thereby obtain a sheet of 120 mm×120 mm in size and 1 mm thick. A density of the sheet was found to be 1.4 $g/cm^3$.

The sheet was heated to 158° C. (temperature a1) in a small-sized biaxial stretching machine (product of Iwamoto Seisakusho K. K.), unidirectionally stretched by 6 times, cooled to 90° C. (temperature b1) by cold air blow, to thereby obtain a porous resin film having a thickness of 310 μm and a density of 0.95 g/cm³. The porosity of the sheet was 32%.

Examples 2 to 12

Comparative Examples 1 to 3

Porous resin films were fabricated similarly to Example 1, except that components listed in Table 1 were used instead.

Dispersion modifiers used in Examples 6 to 8 are ethylene-glycidyl methacrylate copolymer (amount of co-polymerization of glycidyl methacrylate is approx. 12%; product name "Bondfast®-2E" from Sumitomo Chemical; abbrev. EX1), epoxy-modified styrene-butadiene block copolymer (product name "Epofriend® A-1005" from Daicel Chemical Industries, Ltd.; epoxy equivalent is ca. 2,000; abbrev. EX3), and bis(2,6-di-tert-butyl-4-methylphenyl) pentaerythritol diphosphite (product name PEP-36 from Asahi Denka Kogyo K. K.; abbrev. P-1), respectively. The amount of addition of the dispersion modifiers listed in Table 1 is expressed in weight parts per 100 weight parts of the non-hydrophilic thermoplastic resin component.

The stretching factor in Example 9 was 6 simultaneously in the longitudinal and transverse directions.

In Example 10 and Comparative Example 3, the surface of the porous resin film was subjected to corona discharge treatment at an applied energy density of 80 W·min/m² using a corona discharge treatment apparatus (product name "Label Compact discharge treatment system" from Ahlbrandt System GmbH).

Polyalkylene oxide-base resin (abbrev. PEPO2) used in Example 11 is an ester formed between tetradecamethylene dicarboxylic acid and a copolymer of approx. 85% of ethylene oxide and approx 15% of butylene oxide and having a weight-average molecular weight of approx. 20,000, which has an overall molecular weight of approx. 120,000 and a 30-minute water absorption factor of approx. 13 g/g. Polyalkylene oxide-base resin (abbrev. PEPO3) used in Example 12 is an ester formed between phthalic acid and a copolymer of approx. 90% of ethylene oxide and approx 10% of propylene oxide, which has an overall molecular weight of approx. 130,000 and dissolves into water within 30 minutes.

Example 13
Process Step 1

To a mixture of 75 wt % of polypropylene having a melt flow rate (MFR) of 1 g/10 min and 5 wt % of high-density polyethylene, 20 wt % of calcium carbonate powder having an average grain size of 1.5 μm was added to obtain a composition [A]. The composition [A] was kneaded under fusion together with 0.1 weight parts of 4-methyl-2,6-di-tert-butylphenol and 0.05 weight parts of Irganox® 1010 (product of Ciba Geigy), both of which are antioxidants added per total 100 weight parts of the resin components and calcium carbonate powder. The composition [A] was then extruded from a T-die connected to an extrusion machine (temperature set at 250° C.), then cooled using a cooling apparatus, to thereby obtain an unstretched sheet.

The unstretched sheet was then heated to 140° C., and stretched by 4.5 times in the longitudinal direction to thereby obtain a stretched sheet.

Process Step 2

Forty weight percents of polypropylene having an MFR of 5 g/10 min, 10 wt % of polyalkylene oxide-base resin same as that used in Example 1, and 50 wt % of calcium carbonate having an average grain size of 1.3 μm (abbrev. calcium carbonate 2) were mixed and kneaded at 230° C. (temperature a) using a biaxial kneader, extruded in a strand form, and then cut to produce a pelletized composition [B]. The composition [B] was then extruded from a T-die, set at 230° C. and connected to an extrusion machine, into a sheet form so as to be laminated on both sides of the 4.5-time stretched sheet obtained in the Process Step 1, cooled to 55° C. (temperature b), again heated to 154° C. (temperature c) and the stretched by 8 times using a tenter in the transverse direction. The stretched film was then annealed at 155° C. (temperature d), cooled to approx. 55□ (temperature e), had the edge portion thereof slit off, to thereby obtain a triple-layered stacked material ([B]/[A]/[B]=58 μm/44 μm/21 μm) having a total thickness of 123 μm.

Example 14

The surface of the stacked product obtained in Example 13 was subjected to corona discharge treatment. Conditions for the corona discharge treatment were similar to those in Example 10 except for an applied energy density set at 90 W·min/m².

Example 15
Process Step 1

A stretched sheet was obtained similarly to Example 13 except that the components of the composition "A" were altered as 70 wt % of polypropylene, 5 wt % of high-density polyethylene, 5 wt % of polyalkylene oxide-base resin same as that used in Example 1, and 20 wt % of calcium carbonate having an average grain size of 1.5 μm.

Process Step 2

A stacked material of 123 □m thick having a triple-layered structure ([B]/[A]/[B]=58 μm/44 μm/21 μm) was obtained by the similar processes as in Example 13.

The surface of thus obtained stacked product was subjected to corona discharge treatment. Conditions for the corona discharge treatment were similar to those in Example 10 except for an applied energy density set at 60 W·min/m².

Test Examples

Thus obtained multi-layered resin films (Examples 1 to 12, Comparative Examples 1 to 3) and stacked materials using such multi-layered resin films (Examples 13 to 15) were individually subjected to the tests described below.

1) Contact angle to water of porous resin film, and difference between maximum and minimum values thereof Pure water was dropped on the surface of the porous resin film and a contact angle to the water droplet was measured one minute after using a contact angle gauge (Model CA-D, product of Kyowa Kaimen Kagaku K. K.). The measurement was repeated 10 times (each measurement employed unwet, unmeasured film), and an average value of ten measured values and a difference between a maximum value and a minimum value were determined.

2) Porosity of the porous resin film

The porosity was calculated based on the equation below:

$$\text{porosity } (\%) = \frac{100(\rho_0 - \rho)}{\rho_0}$$

where $\rho_0$ is the pre-stretching density of the porous resin film, and $\rho$ is the post-stretching density of the porous resin film.

Another method is such that embedding the porous resin film with an epoxy resin, solidifying the epoxy resin, and slicing the resultant solid using a microtome in a direction parallel to the stretching direction and normal to the major plane of the film. The cut plane of the slice is metallized and the embedded porous resin film was observed under an electron microscope at a 2,000× magnification. Pores in an observation area were contoured on a tracing film and marked by filling the contour, then the obtained pattern was subjected to image processing using an image analyzer (LUZEX IID, product of Nireco Corporation). Porosity was determined based on the areal ratio of the pores.

3) Ink drying property

Color charts for evaluation (2 cm×2 cm monochromatic 50% printing and monochromatic 100% printing, and 2 cm×2 cm multi-color 200% printing) were developed and printed on the porous resin film using pigment inks (yellow, magenta, cyan, and black) and an ink-jet printer (Model JP2115, product of Graphtec Corporation). Filter paper was periodically pressed to the printed portion and whether the ink migrates back to the filter paper or not was checked. Time point when the ink migration terminates was recorded and the ink drying performance was assessed based on the following criteria:

0: ink migration back to the filter paper stopped immediately after the printing;

1: ink migration back to the filter paper stopped within 1 minute;

2: ink migration back to the filter paper stopped between 1 to 2 minutes;

3: ink migration back to the filter paper stopped between 2 to 3 minutes;

4: ink migration back to the filter paper stopped between 3 to 4 minutes;

5: ink migration back to the filter paper stopped between 4 to 5 minutes; and

6: ink migration back to the filter paper did not stop beyond 5 minutes.

4) Evaluation of non-uniform density

Non-uniformity in the density after the ink absorption was visually checked and assessed based on the following criteria:

1: no non-uniformity in density;

2: slight non-uniformity in density;

3: well defined non-uniformity in density; and

4: distinct non-uniformity in density.

Results of these evaluations were listed in Tables 1 and 2.

TABLE 1

|  | unit | Example 1 | Comparative Example 1 | Comparative Example 2 | Example 2 | Example 3 | Example 4 | Example 5 |
|---|---|---|---|---|---|---|---|---|
| Compounded component |  |  |  |  |  |  |  |  |
| <Non-hydrophilic thermoplastic resin component> Polypropylene content | wt %/weight part | 38/100 | 50/100 | 76/100 | 41/100 | 34/100 | 32/100 | 32/100 |
| <Hydrophilic resin> |  |  |  |  |  |  |  |  |
| Species (abbrev.) | — | PEPO1 | — | PEPO1 | PEPO1 | PEPO1 | PEPO1 | PEPO1 |
| Content | wt %/weight part | 12/32 | — | 24/32 | 9/22 | 16/43 | 18/56 | 8/56 |
| <Fine powder> Content of calcium carbonate 1 | weight part | 50 | 50 | — | 50 | 50 | 50 | 50 |
| <Dispersion modifier> |  |  |  |  |  |  |  |  |
| Species (abbrev.) | — | — | — | — | — | — | — | — |
| Content | weight part | — | — | — | — | — | — | — |
| Forming conditions |  |  |  |  |  |  |  |  |
| Temperature a1 | ° C. | 158 | 158 | — | 158 | 158 | 158 | 158 |
| Temperature b1 | ° C. | 90 | 90 | — | 90 | 90 | 90 | 90 |
| Stretching factor | times | 6 | 6 | — | 6 | 6 | 6 | 6 |
| Types of surface oxidation treatment | — | — | — | — | — | — | — | — |
| Energy for surface oxidation treatment | $W \cdot min/m^2$ | — | — | — | — | — | — | — |
| Evaluation results of the films |  |  |  |  |  |  |  |  |
| Average surface contact angle to water | ° | 80 | 114 | 41 | 83 | 67 | 65 | 80 |
| Difference between maximum and minimum values of contact angle to water | ° | 8 | 2 | 12 | 7 | 8 | 9 | 7 |
| Porosity | % | 32 | 32 | 0 | 30 | 31 | 33 | 55 |
| Ink drying property (monochromatic 50%) | — | 0 | 6 | 6 | 0 | 0 | 0 | 0 |
| Ink drying property (monochromatic 100%) | — | 0 | 6 | 6 | 0 | 0 | 0 | 0 |
| Ink drying property (multi-color 200%) | — | 0 | 6 | 6 | 1 | 0 | 1 | 2 |
| Non-uniformity in density | — | 1 | 4 | 4 | 2 | 1 | 2 | 2 |
| Film thickness | μm | 310 | 257 | 1007 | 382 | 298 | 265 | 482 |

TABLE 1-continued

| | unit | Example 6 | Example 7 | Example 8 | Example 9 | Example 10 | Comp. Example 3 | Example 11 | Example 12 |
|---|---|---|---|---|---|---|---|---|---|
| Compounded component | | | | | | | | | |
| <Non-hydrophilic thermoplastic resin component> Polypropylene content | wt %/weight part | 38/100 | 38/100 | 38/100 | 38/100 | 38/100 | 50 | 38/100 | 30/100 |
| <Hydrophilic resin> | | | | | | | | | |
| Species (abbrev.) | — | — | PEPO1 | PEPO1 | PEPO1 | PEPO1 | PEPPO1 | — | PEPO2 | PEPO3 |
| Content | wt %/weight part | 12/32 | 12/32 | 12/32 | 12/32 | 12/32 | — | 12/32 | 20/67 |
| <Fine powder> Content of calcium carbonate 1 | weight part | 50 | 50 | 50 | 50 | 50 | 50 | 50 | 50 |
| <Dispersion modifier> | | | | | | | | | |
| Species (abbrev.) | — | — | EX1 | EX2 | P-1 | — | — | — | — |
| Content | weight part | | 3 | 3 | 0.5 | — | — | — | — |
| Forming conditions | | | | | | | | | |
| Temperature a1 | ° C. | 158 | 158 | 158 | 160 | 158 | 158 | 158 | 156 |
| Temperature b1 | ° C. | 90 | 90 | 90 | 90 | 90 | 90 | 90 | 90 |
| Stretching factor | times | 6 | 6 | 6 | L6,T6* | 6 | 6 | 6 | 6 |
| Types of surface oxidation treatment | — | — | — | — | — | corona discharge | corona discharge | — | — |
| Energy for surface oxidation treatment | W · min/m² | — | — | — | — | 80 | 80 | — | — |
| Evaluation results of the films | | | | | | | | | |
| Average surface contact angle to water | ° | 80 | 80 | 80 | 95 | 48 | 76 | 76 | 78 |
| Difference between maximum and minimum values of contact angle to water | ° | 5 | 5 | 4 | 6 | 6 | 2 | 7 | 11 |
| Porosity | % | 32 | 32 | 32 | 75 | 32 | 32 | 35 | 30 |
| Ink drying property (monochromatic 50%) | — | 0 | 0 | 0 | 0 | 0 | 6 | 0 | 0 |
| Ink drying property (monochromatic 100%) | — | 0 | 0 | 0 | 1 | 0 | 6 | 0 | 0 |
| Ink drying property (multi-color 200%) | — | 0 | 0 | 0 | 3 | 0 | 6 | 0 | 2 |
| Non-uniformity in density | — | 1 | 1 | 1 | 2 | 1 | 4 | 1 | 2 |
| Film thickness | μm | 300 | 300 | 310 | 188 | 310 | 257 | 344 | 310 |

*L = longitudinal, T = transverse

TABLE 2

| | unit | Example 13 | Example 14 | Example 15 |
|---|---|---|---|---|
| Compounded Component | | | | |
| <Non-hydrophilic thermoplastic resin component> Polypropylene content | wt %/weight part | 40/100 | 40/100 | 40/100 |
| <Hydrophilic resin> | | | | |
| Species (abbrev.) | — | PEPO1 | PEPO1 | PEPO1 |
| Content | wt %/weight part | 10/25 | 10/25 | 10/25 |
| <Fine powder> Content of calcium carbonate 2 | weight part | 50 | 50 | 50 |
| Forming conditions | | | | |
| Temperature a | ° C. | 250 | 250 | 250 |
| Temperature b | ° C. | 50 | 50 | 50 |
| Temperature c | ° C. | 154 | 154 | 154 |
| Temperature d | ° C. | 155 | 155 | 155 |
| Temperature e | ° C. | 55 | 55 | 55 |
| Types of surface oxidation treatment | — | — | corona discharge | corona discharge |
| Energy for surface oxidation treatment | W · min/m² | — | 90 | 60 |
| Evaluation results of the films | | | | |
| Average surface contact angle to water | ° | 96 | 60 | 61 |
| Difference between maximum and minimum values of contact angle to water | ° | 11 | 8 | 8 |
| Internal porosity of porous resin film (i) | % | 58 | 58 | 58 |
| Ink drying property (monochromatic 50%) | — | 0 | 0 | 0 |
| Ink drying property (monochromatic 100%) | — | 0 | 0 | 0 |
| Ink drying property (multi-color 200%) | — | 0 | 0 | 0 |

TABLE 2-continued

|  | unit | Example 13 | Example 14 | Example 15 |
|---|---|---|---|---|
| Non-uniformity in density | — | 1 | 1 | 1 |
| Thickness of stacked material | μm | 123 | 123 | 123 |
| Thickness of porous resin film (i) | μm | 58 | 58 | 58 |
| Thickness of resin film (ii) (base layer) | μm | 44 | 44 | 44 |

As is clear from Table 1, the porous resin films (Examples 1 to 12) of the present invention show excellent ink absorbing and drying properties even when the ink discharge is large, and also show a small non-uniformity in the printing density. On the contrary, the resin film containing no hydrophilic resin (Comparative Example 1) and the multi-layered stretched resin film containing no fine powder (Comparative Example 2) only showed a poor ink drying property and a large non-uniformity in the printing density.

When compared between those subjected to the surface oxidation treatment, the porous resin film of the present invention (Example 10) was superior in the ink drying property and uniformity in the printing density to the film containing no hydrophilic resin (Comparative Example 3).

Moreover, the stacked material using the porous resin film of the present invention (Examples 13 to 15) also showed excellent ink absorbing and drying properties and a small non-uniformity in the printing density.

Industrial Applicability

A porous resin film of the present invention shows quite excellent ink absorbing and drying properties even when a large amount of ink is discharged thereon, and can be fabricated at a low cost. Using such porous resin film or a stacked material having such porous resin film stacked on a base layer can provide a recording medium capable of providing a high-definition image Thus the present invention is widely applicable to various printing purposes and absorption base materials.

This application is based on Japanese application JP 10/288,967 filed Oct. 12, 1998, and JP 11/220,656 filed Aug. 4, 1999, and International application PCT/JP99/05547 filed Oct. 7, 1999, the entire contents of each of which being hereby incorporated by reference.

What is claimed is:

1. A porous resin film, comprising:
    30 to 90 wt % of a thermoplastic resin comprising 100 weight parts of a non-hydrophilic polyolefin-based resin and 22 to 67 weight parts of a hydrophilic alkylene oxide-based resin; and
    70 to 10 wt % of an inorganic or organic fine powder;
    wherein a surface of said porous resin film has a contact angle to water of 110° or less and a difference between a maximum value and a minimum value of said contact angle to water is 20° or less; and
    wherein said film has a porosity of 10% or above.

2. The porous resin film as claimed in claim 1, wherein said alkylene oxide-based polymer is obtained by polymerizing an organic compound having two active hydrogen atoms with ethylene oxide to obtain a product, polymerizing the product with a $C_4$ or larger alkylene oxide to obtain a second product, and further polymerizing the second product with ethylene oxide.

3. The porous resin film as claimed in claim 1, wherein said alkylene oxide-based polymer has an alkylene oxide portion having a weight-average molecular weight of 5,000 to 30,000.

4. The porous resin film as claimed in claim 1, wherein said alkylene oxide-based polymer has a weight-average molecular weight of 20,000 to 400,000.

5. The porous resin film as claimed in claim 1, wherein said inorganic or organic fine powder has an average grain size of 0.1 to 10 μm.

6. The porous resin film as claimed in claim 1, further comprising 0.01 weight parts or more of a dispersion modifier for promoting mutual dispersion of said hydrophilic alkylene oxide-based resin component and said non-hydrophilic polyolefin-based resin component per 100 weight parts of said non-hydrophilic polyolefin-based resin component.

7. The porous resin film as claimed in claim 6, wherein said dispersion modifier is a polar resin or a phosphorus-containing compound.

8. The porous resin film as claimed in claim 7, wherein said polar resin is contained in an amount of 0.1 weight parts or more per 100 weight parts of said non-hydrophilic polyolefin-based resin component.

9. The porous resin film as claimed in claim 8, wherein said polar resin is selected from the group consisting of epoxy group-containing olefinic copolymers and epoxy group-containing diene-based polymers.

10. The porous resin film as claimed in claim 7, wherein said phosphorus-containing compound is contained in an amount of 0.01 weight parts or more per 100 weight parts of said non-hydrophilic polyolefin-based resin component.

11. The porous resin film as claimed in claim 10, wherein said phosphorus-containing compound is selected from the group consisting of phosphites and phosphonate compounds.

12. The porous resin film as claimed in claim 1, wherein said film is stretched.

13. The porous resin film as claimed in claim 1, wherein said film has a surface finished by oxidation treatment.

14. A laminated material comprising a base layer and a porous resin film as claimed in claim 1 on at least one side of said base layer.

15. The laminated material as claimed in claim 14, wherein said base layer comprises a resin film which contains 40 to 100 wt % of a thermoplastic resin and 60 to 0 wt % of an inorganic or organic fine powder.

16. The laminated material as claimed in claim 15, wherein said resin film is stretched.

17. The laminated material as claimed in claim 15, wherein said inorganic or organic fine powder contained in said resin film and has an average grain size of 0.1 to 10 μm.

18. The laminated material as claimed in claim 15, wherein said thermoplastic resin contained in said resin film is selected from the group consisting of a non-hydrophilic thermoplastic resin, a hydrophilic thermoplastic resin, and a mixture of a non-hydrophilic thermoplastic resin and a hydrophilic thermoplastic resin.

19. The laminated material as claimed in claim 15, wherein said thermoplastic resin contained in said resin film is selected from the group consisting of an olefinic thermoplastic resin, a hydrophilic thermoplastic resin, and a mixture of an olefinic thermoplastic resin and a hydrophilic thermoplastic resin.

20. A recording medium comprising a porous resin film as claimed in claim 1.

21. A recording medium comprising a porous resin film as claimed in claim 14.

22. An ink-jet recording medium comprising a porous resin film as claimed in claim 1.

23. An ink-jet recording medium comprising a porous resin film as claimed in claim 14.

24. The porous resin film as claimed in claim 1, wherein said difference between a maximum value and a minimum value of said contact angle to water is 10° or less.

* * * * *